March 14, 1961 H. BROOKS ET AL 2,974,623
TORPEDO DEPTH STEERING ENGINE CONTROL
Filed Aug. 17, 1951 2 Sheets-Sheet 2

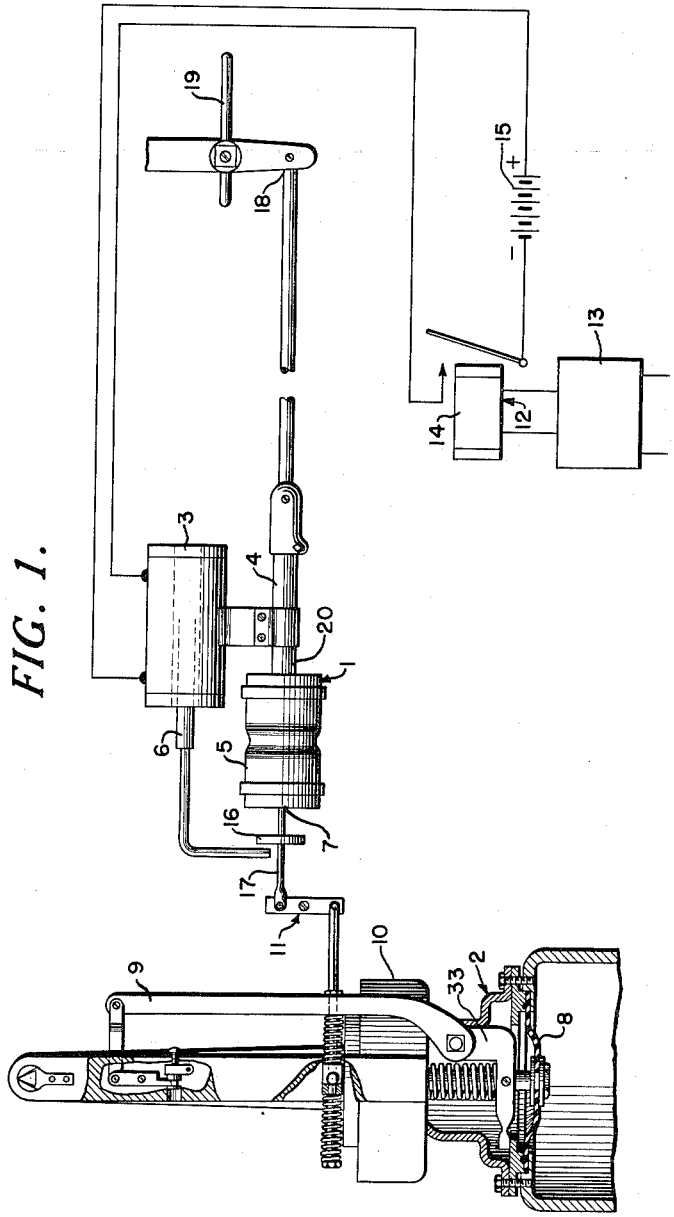

Inventors
H. BROOKS
J. W. BALLOU
By G. D. O'Brien
R. M. Hicks
Attorneys ized by the system of the instant invention wherein the apparatus is only required to exert control action thereover.

2,974,623
TORPEDO DEPTH STEERING ENGINE CONTROL

Harvey Brooks, Schenectady, N.Y., and Jack W. Ballou, Wilmington, Del., assignors to the United States of America as represented by the Secretary of the Navy Filed Aug. 17, 1951, Ser. No. 242,400

7 Claims. (Cl. 114—25)

This invention relates to depth-steering apparatus for controlling the underwater running depth of a submerged automotive vehicle and more particularly to an electromechanical depth controlling device which is operable in response to a predetermined signal received from a target, for initiating a change from a preselected running depth of travel of the vehicle to a travel level at substantially the same depth of submergence as that of the target to be destroyed thereby. The present invention is well adapted for use with underwater vehicles such, for example, as a torpedo.

In prior underwater vehicles employed as an ordnance weapon it is customary to operate the depth-steering engine as, for example, that of a standard torpedo, by means of a link which has either an essentially rigid connection with a pendulum and a hydrostat or is connected thereto by means of springs. The link, in turn, is connected to a valve element which controls the engine operating therein in a manner to admit air to one side or, alternately, to the other side of the operating piston thereof. The piston of such a device is attached directly to the elevator control rod in a manner whereby the piston which is adapted to be moved by air pressure, will actuate the control rod with sufficient force to shift the elevators and impart upward and downward motion selectively to the torpedo as it moves through the water.

The device of the instant invention is well adapted for use with an instrumentality deriving its power from a conventional air operated steering engine. Additionally, the device functions to operate the elevators in response to an acoustic signal and to thereafter control the travel of the underwater vehicle acoustically by signals received from a target to be destroyed.

Any suitable characteristic peculiar to the target which can be detected and transferred into electrical intelligence impulses, may be converted for use in actuating the device of the instant invention. An acoustic system capable of detecting the noise characteristics of the target and also capable of transforming these noise characteristics into electrical impulses may be adapted to deliver the control signals to the device of the present invention. An acoustic system of this character is disclosed in the application, Serial No. 502,075, filed September 11, 1943. This acoustic system as well as the other known systems such for example as devices of the type capable of detecting magnetic signals, or those devices using pressure signals and the like, may equally well be adapted for delivering such signals to the structural embodiment of the present invention, wherein the device of the instant invention utilizes these received signals to change the running depth of the submerged underwater vehicle to a collision depth corresponding to that of the target depth.

The electro-mechanical depth controlling device of the instant invention is well adapted for use with the air engine type controlling apparatus of standard torpedoes; since it comprises facilities for operation in an overriding relationship with such an air engine. An air operated steering engine as utilized in the standard torpedo delivers a substantial amount of power to the control surfaces. This available power for transfer action is advantageously utilized by the system of the instant invention wherein the apparatus is only required to exert control action thereover.

One object of the instant invention resides in the provision of a depth-steering system for an underwater vehicle which includes, in addition to the pendulum and hydro-diaphragm depth control means of standard torpedoes, an electrically actuated depth engine operating device which is adapted for operational connection in overriding relationship with the hydro-diaphragm depth control means when a predetermined signal is received from a target.

Another object of the invention is to provide a depth-steering system for a torpedo which is responsive to a predetermined signal received from a target disposed within the water at a lesser depth of submersion than the torpedo and which will function to cause the torpedo to veer upwardly and to travel at the depth level of the target.

A further object of the invention is to provide in addition to the conventional pendulum and hydro-diaphragm type device, depth control apparatus for an underwater vehicle which, in response to a predetermined target signal characteristic, renders ineffective the depth controlling effect of the pendulum and hydro-diaphragm devices embodied in the vehicle.

Still another object of the present invention resides in the provision of a new and novel electrical connection for use between the pendulum and the depth engine whereby a solenoid is energized by movement of the pendulum, which solenoid in turn is connected to the depth engine.

An additional object of the invention resides in the provision of a depth steering system comprising an up solenoid and a down solenoid, each of which is operatively connected to the depth engine and selectively energized by either the pendulum and hydro-diaphragm controlled electrical circuit or by an acoustic signal responsive circuit which causes the up solenoid to be energized and renders the other circuit ineffective during receipt of the acoustic signal.

A further object of the invention resides in the provision of depth control apparatus capable of maintaining an underwater vehicle at a predetermined fixed depth of submergence until an electrical signal indicative of a target disposed at a different depth of submersion is transmitted to the depth control apparatus and which thereafter causes the underwater vehicle to home on the target.

It is also an object of this invention to provide a depth controlling device for an underwater vehicle which upon receipt of a predetermined signal, such for example as an acoustic signal, initiates rising action thereof from a preselected depth of submergence to cause the underwater vehicle to run at the depth of the target emitting said signal, and which depth controlling means prevents the vehicle from descending below said preselected depth to thereby insure the safety of the launching vessel.

Other objects and many of the attendant advantages of this invention will be apparent and more readily appreciated as the inventive concept becomes better understood through reference to the following detailed description when consideration thereof is taken in connection with embodiments illustrated on the accompanying drawings wherein:

Fig. 1 is a diagrammatic illustration of a single solenoid controlled torpedo steering arrangement according to a preferred embodiment of the invention;

Figure 3:
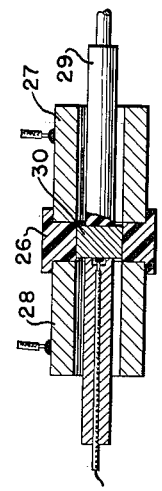
Fig. 3 is a sectional view of the pendulum controlled switch.

Referring now to the drawings for a more complete understanding of the invention and more particularly to Fig. 1 thereof, a depth-engine steering control assembly is generally illustrated at 1. This assembly comprises the well-known pendulum and hydro-diaphragm mechanism 2 which maintains an underwater vehicle at a preselected, desired depth during its run. It also includes a solenoid 3 mounted on the piston rod 4 of the air powered depth-engine 5 which when energized by preselected signal control, such for example as by the acoustic signal from a target, causes the armature 6 to operate the valve at 7 of the depth engine 5 in a manner to produce up rudder, thereby causing the torpedo to rise to the depth of the target and travel at a collision depth therewith. The valve at 7 is so constructed that movement in one direction admits air to one side of a piston in the valve while valve movement in the opposite direction admits air to the opposite side of the piston.

The hydro-diaphragm 8 is exposed to sea pressure and is adjusted to a preselected depth setting before launching the underwater vehicle. A system of levers and links 9 transmits the depth controlling force from the hydro-diaphragm 8 to the suspended pendulum 10. The pendulum is, in turn, connected to the valve at 7 of the depth engine 5 by a system of levers 11. The pendulum 10 produces motion of the valve at 7 when the torpedo inclines from a horizontal attitude. It is evident, therefore, that the pendulum 10 and hydro-diaphragm 8 exercise a modifying effect on each other when they are actuated at the same time. This latter is what is known as the Uhlan principle which is now employed in torpedo depth control systems.

An electrical switch 12 is controlled by action of the direct current amplifier 13 which energizes the relay 14 when a predetermined signal, such for example as an acoustic signal from a target vessel located above and away from the torpedo, is received by the torpedo. When the relay 14 is energized, switch 12 is closed and the solenoid 3 is energized from a power source, such for example, as battery 15. Upon energization of the solenoid 3, the armature 6 which operatively engages the projection 16 on the valve rod 17 is moved inward, forcing the valve at 7 into the depth engine 5, thereby causing the engine to produce up rudder through the connection linkage 18 from the piston thereof to the rudders 19. The solenoid 3 is mounted on the piston rod in a manner to be carried therewith as the piston at 20 moves to the end of the travel path. The valve at 7 is forced along as the piston moves the solenoid 3 and functions to maintain sufficient air pressure on the piston to provide for movement thereof to the end of its path and to thereby produce full up rudder under full stroke conditions. Under this control action, the torpedo will be caused to rise to substantially the level of the target vessel.

Since, in accordance with the preferred embodiment, the solenoid 3 is only actuated when the signal is received from above the torpedo, the hydro-diaphragm 8 will exert force to return the torpedo to the preselected depth. When however the torpedo descends below the depth of the target vessel, the solenoid 3 is again actuated to apply the armature force in overriding relationship with the hydro-diaphragm force to produce up rudder. As a result of these opposing forces the torpedo will tend to porpoise in a hunting action before settling down under this control to a true collision depth course at a level corresponding to that of the target vessel. In the event of acoustic signal termination, the pendulum and hydro-diaphragm system assumes complete control in returning the torpedo to the preselected depth.

If the acoustic signal source is below the underwater vehicle the relay thereof is de-energized thus allowing switch 12 to open for complete return of control to the pendulum and hydro-diaphragm system. Since the acoustic system is constructed and arranged to respond to signals produced by targets thereabove, the torpedo return is only to the preselected depth. The launching vessel thus maintains itself in a state of protection from the vehicle by remaining below the running depth for which the hydro-diaphragm 8 in the torpedo is set.

It is believed obvious that firing may be initiated by a surface vessel and that torpedo control in searching out and descending to a collision course with a submerged submarine may be provided by merely presetting the controlling arrangement of the receiving and amplifying apparatus for response to a signal, such for example as an acoustic signal, of a character originating on the bottom instead of on the top of the torpedo.

Figure 2:
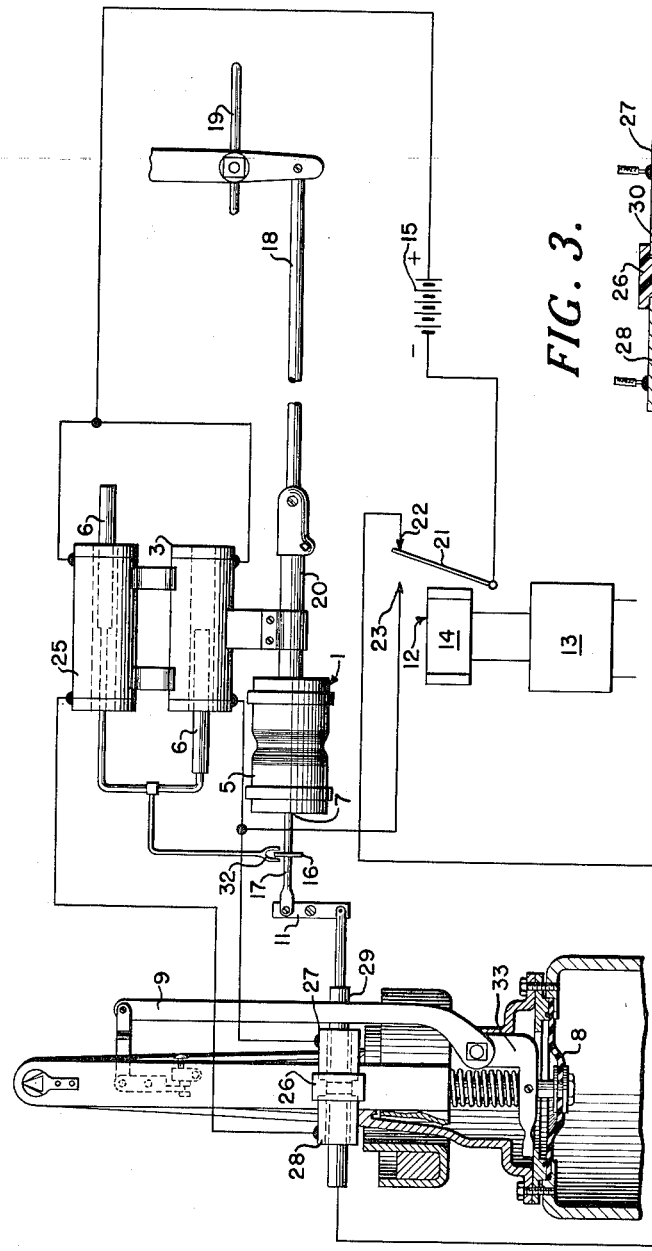
Fig. 2 is a diagrammatic illustration of a steering system similar to that of Fig. 1, but embodying a pair of solenoid units.

In Figs. 2 and 3, the showing is of a modification of the present invention, the device of which is also adapted, upon receipt of a predetermined signal from a target, to cause the underwater vehicle to change its running depth to a collision depth with the target. As hereinbefore stated, the signal may be of any type, such as, for example, an acoustic signal, capable of pickup recognition and subsequent transformation into an electrical impulse for utilization by an electronic switch incorporated in the direct current amplifier circuit for energization of the relay 14, to thereby move the switch member 21 from the pendulum circuit contact 22 to the acoustic signal circuit contact 23. The structure and arrangement of the modification shown in Figs. 2 and 3 is somewhat similar to the previously described embodiment, but differs therefrom in the incorporation of an electrical circuit connection between the pendulum at 24 thereof and the valve at 7. This electrical circuit replaces the link connection between the pendulum and the linkage at 11. The pendulum 10 has connected thereto an insulating tube 26 in supporting relationship at the ends thereof with a pair of brass inserts 27 and 28, respectively, for control of the up and down solenoids 3 and 25. The valve linkage is provided with a cylindrical insulator 29 which is slidably positioned in the tubular interiors of the inserts and which carries a contacting element 30 at the end thereof. The position of the contact element 30 is such that when the pendulum is centered on the support arms 31, the position of the contact is at the insulator 26. This position corresponds to a horizontal position of the steering elevators. However, should the pendulum move to either side of its center position, the contact 30 will engage brass inserts 27 or 28 to complete the electrical circuit between the valve connected contact and the insert. The up solenoid 3 and the down solenoid 25 are connected to the piston fork 32 for translatory movement of the valve therewith.

The up solenoid circuit includes the solenoid 3, the up brass insert 27, acoustic signal circuit contact 23, and the switch member 21, all of which are connected with the power source 15. The down solenoid circuit includes the down-brass insert 28, pendulum circuit contact 22, the switch member 21, and the power source 15. The solenoid armatures 6 are slidably mounted within the solenoids and arranged for operation thereby, in a manner whereby one end of the shaft thereof is in operative engagement with the projection 16 on the valve at 7.

In absence of an acoustic signal the torpedo will run at a set depth in accordance with the adjustment of the hydro-diaphragm 8 which, through linkage 9, moves the pendulum in a manner to close the switch circuit of either the up or down solenoid circuit. Closing of either switch circuit energizes the solenoid associated therewith to cause the armature thereof to move and operate the depth engine 5. The pendulum alone, or in combination with the hydro-diaphragm, also exercises control energization over the up and down solenoids when the attitude of the torpedo deviates from the horizontal.

Full up rudder and down rudder control action is produced by the apparatus since the solenoids 3 and 25 are carried by the piston rod 4 of the depth engine in a manner to thereby maintain active the valve controlling air pressure on the piston whereby the valve is active to the end of the piston rod stroke.

In operation, the device is activated by reception of a predetermined signal, of a character as for example that of an acoustic signal produced by a target located above and away from the torpedo. When such a target is in the effective acoustic field of the torpedo, the depth steering operation thereof as normally controlled by the pendulum-hydro-diaphragm is transferred from the pendulum switch controlled circuit to the acoustic signal controlled circuit. The relay 14 is then energized by the electronic switch, not shown, of the amplifier circuit causing the switch member 21 associated with the relay to be moved from the pendulum circuit contact 22 to the acoustic signal circuit contact 23. Current flow is then only through the up solenoid 3, wherein solenoid actuation produces valve, piston and rudder movement in a manner which causes the torpedo to ascend to the depth of the target. Upon reaching the target depth at the end of the ascension travel, the acoustic signal relationship with respect to the torpedo is no longer that of being located above the torpedo, but rather at substantially the same level. The relay 14 is de-energized under the resulting signal location condition to relinquish acoustical control and allow the hydro-diaphragm to exercise control in producing down rudder. The torpedo will tend to fluctuate between depths above and below the target collision depth until the opposing forces exerted by the acoustic control and the hydro-diaphragm control are resolved to a balanced control condition at which time the torpedo travel path will be at a constant collision depth with the target.

In the operation of the alternative embodiment of the present invention, wherein the pendulum and hydro-diaphragm are arranged to electrically actuate the depth control system, the exercise of complete control thereby in causing the torpedo to descend to its original preselected running depth will occur in the event the acoustic signal ceases. This transfer of rudder control from acoustic response system activity is accomplished through de-energization of the relay 14, to thereby allow return of the switch member 21 to the pendulum circuit contact 22 thereof.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. A valve operating device for an air depth engine of an underwater vehicle depth rudder steering system comprising, a pendulum and hydro-diaphragm means of a type in which each is respectively constructed and arranged to exercise a modifying effect on the action of the other with respect to concerted movement of the valve thereby, connecting means operatively correlating pendulum and hydro-diaphragm means movement to produce actuation of the valve, and up-rudder electrical control means comprising a solenoid having an armature disposed for movement therein, and valve actuating means carried by said armature and operatively engageable with the valve to provide movement thereof only in a predetermined direction with a force capable of rendering the pendulum and hydro-diaphragm means subsequently ineffective for down rudder control and means responsive upon reception of a predetermined signal inherently emitted by a target for operating the valve by said solenoid means, said up-rudder control means including means for mounting said solenoid means on the piston of the engine for movement therewith in a manner for releasing operative control of said valve by said solenoid with discontinuance of said predetermined signal and effective only for producing maximum up-rudder movement.

2. A depth steering device for an underwater vehicle comprising an air depth engine having a valve control therefor and a piston therein operatively connected to the depth rudder steering means of the vehicle, the valve control means thereof including a pendulum and a hydro-diaphragm means constructed and arranged to exercise a modifying effect on the action of the other with respect to movement of the valve, solenoid means mounted on the piston assembly of the depth engine for translatory movement therewith to effect only a unidirectional control thereover, connecting means operatively correlating solenoid action with valve actuation, and electrical control means responsive to a predetermined signal received from a target for operatively initiating solenoidal control valve action in a predetermined direction with a force capable of rendering the pendulum and hydro-diaphragm means ineffective for control thereover.

3. A depth control device for underwater vehicles comprising, in combination, a depth controlling means having a Uhlan principle type pendulum and hydro-diaphragm assembly linked to the valve of an air depth engine, the piston of which said engine is operatively connected by the piston rod thereof to the depth rudder linkage of the vehicle, a solenoid mounted on the piston rod for translatory movement therewith, solenoid armature means slidably mounted with respect to said solenoid and operatively engaging said valve in a manner to produce unidirectional control thereover only when the solenoid is energized, the solenoid armature means engagement with the valve being constructed to be ineffective thereover when de-energized and such as to render the pendulum and hydro-diaphragm control ineffective thereover during periods of solenoid energization, an electrical power source, relay means for electrically connecting the solenoid to the power source, and relay actuating means for energizing said relay in response to a predetermined signal from above the underwater vehicle.

4. A control device for the valve of an air depth engine of the type used in underwater vehicles comprising a piston assembly operatively connected to the depth rudder linkage of the vehicle; solenoid circuit means mounted on the piston assembly for translatory movement therewith, said solenoid circuit means having an up solenoid and a down solenoid; armature means thereof operatively engaging the valve and constructed and arranged to be moved selectively by the solenoid means; energizing means for said solenoid means including a power source, a Uhlan principle type pendulum and hydro-diaphragm means constructed and arranged to exercise a modifying effect on each other with respect to concerted movement thereof, electrical contact means mounted on the pendulum, a contact mounted on the valve for engagement with said contact means for selectively energizing either the up or down solenoids in accordance with the movement of the pendulum away from the central position thereof, relay means connected in the solenoid circuit, and means for energizing the relay means in response to a predetermined signal from a target located above the underwater vehicle and for causing the relay means to open the electrical connection of the pendulum and hydro-diaphragm means with the solenoid means and to close the connection from the signal responsive means to the solenoid means to thereby energize the up solenoid and cause the underwater vehicle to rise to the depth of the target.

5. An underwater vehicle depth engine valve control means comprising a suspended pendulum, a hydro-diaphragm linked to the pendulum in a manner such that each exercises a modifying effect on the other, an up solenoid and a down solenoid mounted on the piston of the depth engine for translatory movement therewith, armature means slidably mounted on said solenoids for actuation thereby and operatively connected to the valve of the depth engine, electrical circuit means including a power source, contact means mounted on the valve, an up contact and a down contact mounted on the pendulum in a manner such that movement of the pendulum away from its central position causes engagement of one of the pendulum contacts with the valve contact means thereby actuating the associated up or down solenoid, and means responsive to an acoustic signal received from a target located above and away from the vehicle for causing the up solenoid to be energized and for rendering the pendulum circuit ineffective whereby the vehicle is caused to rise to a collision depth with the target.

6. Operating means for the valve of a piston-type air depth engine for an underwater vehicle comprising solenoid means mounted on said piston for translatory movement therewith, solenoid armature means slidably mounted on said solenoid means and operatively engaging the valve of the depth engine, a power source, circuit means connecting said solenoid means to the power source, said circuit means including first switch means responsive to the tilt and depth of the underwater vehicle to energize said solenoid means in a manner to return said underwater vehicle to a preselected depth and a horizontal position, and second switch means responsive to a predetermined signal from a target above said underwater vehicle to remove said first switch means from the circuit and to energize said solenoid means in a manner such that the armature moves the valve to up position thereby causing the underwater vehicle to rise to a collision depth with the target.

7. Depth control means for an underwater vehicle comprising a depth engine having a valve, a piston, said piston having a piston rod connected for operation of the depth rudder of the underwater vehicle, a pendulum, pendulum suspension means, connecting means operatively correlating pendulum movement with the valve, a hydro-diaphragm, means for operatively connecting the hydro-diaphragm to the pendulum to permit each to exercise a modifying effect on the other with respect to valve movement, a solenoid mounted on said piston rod for translatory movement therewith, solenoid armature means slidably mounted in the solenoid for controlled movement thereby and having an actuating member in operative engagement with said connecting means for said valve, a power source, electrical relay means for controlled connecting of the solenoid to the power source in response to a suitable acoustic input signal, and means responsive to acoustic signals received from above and away from the underwater vehicle for electrical relay means actuation to thereby cause the armature means to effect control through said connecting means for overriding depth control by the pendulum and hydro-diaphragm and to exercise dominant control over the movement of said valve.

References Cited in the file of this patent

UNITED STATES PATENTS

| | | |
|---|---|---|
| 1,145,355 | Dieter | July 6, 1915 |
| 1,312,510 | Baker | Aug. 12, 1919 |
| 1,892,431 | Hammond | Dec. 27, 1932 |
| 2,060,200 | Hammond | Nov. 10, 1936 |
| 2,766,713 | Kelsay | Oct. 16, 1956 |